3,728,241
ELECTROLYSIS OF FUSED MATERIAL
Thomas Richard Shelley and James Anthony Charles, Cambridge, England, assignors to National Research Development Corporation, London, England
Filed Apr. 15, 1970, Ser. No. 28,644
Claims priority, application Great Britain, Apr. 17, 1969, 19,751/69
Int. Cl. C01b 13/14; C22b 5/00
U.S. Cl. 204—164
11 Claims

ABSTRACT OF THE DISCLOSURE

According to the present invention a method of separating a required component from an electrolyte bath containing a molten material, e.g. a slag or ore which includes a component which is volatile or is convertible into a volatile compound by electrolysis, electrolysing the melt by passing a current between a pair of electrodes along a path which includes an arc struck between one electrode and the melt, and drawing off the required volatile component or volatile compound thereof given off from the melt during electrolysis, the composition of the melt being such that a major part of the required component is a product of electrolysis released at said arc.

Figure 1:
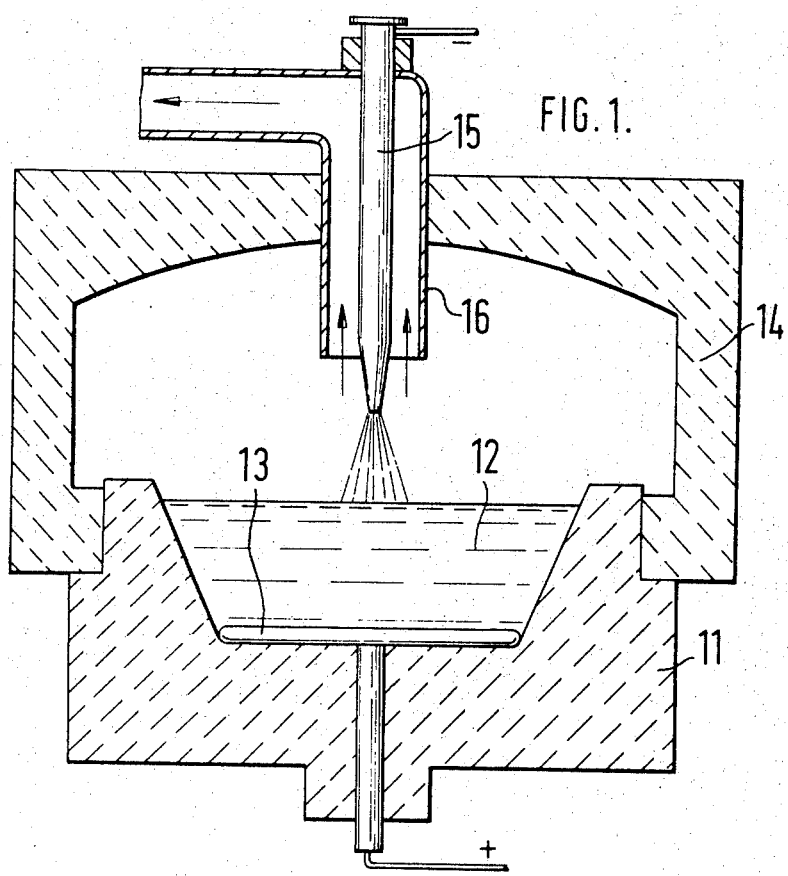

The method is of particular interest for recovery of tin.

---

The present invention relates to the separation of a component from a melt of a fused ore or slag by electrolysis.

The separation of such components by normal electrolysis is frequently uneconomic due to low efficiency resulting from polarisation effects, and due to contamination of the required component by contact with the electrodes during the electrolysis.

According to the present invention a method of separating a required component from an electrolytic bath containing a molten material, e.g. a slag or ore which includes a component which is volatile or is convertible into a volatile compound by electrolysis, electrolysing the melt by passing a current between a pair of electrodes along a path which includes an arc struck between one electrode and the melt, and drawing off the required volatile component or volatile compound thereof given off from the melt during electrolysis, the composition of the melt being such that a major part of the required component is a product of electrolysis released at said arc.

The invention also comprises apparatus for carrying out the above method comprising a bath for containing a melt formed from an ore or slag a pair of electrodes positioned to pass a current along a path which includes an arc struck between one of the electrodes and the melt to effect electrolysis of the melt, and means for drawing off a required component of the melt or a volatile compound thereof in the form of a vapour given off from the melt by electrolysis.

The process of the invention may be carried out by striking an arc between the melt and the anode, cathode, or preferably both.

During the course of operation, the melt may be maintained in its molten condition by the heat generated by the arc.

Where an arc is struck from only one electrode to the melt, the other electrode may be in contact with the melt at the base of the bath and in such a case the melt may be heated in the first instance by an arc struck between the electrode and a subsidiary electrode above the surface of the ore. After the ore has been heated to form the melt, the subsidiary electrode can be withdrawn and the further heating of the melt maintained by the electrolysing arc.

The base electrode may be either the anode or cathode electrode, and may conveniently be formed of iron and surrounded by a cooling element. In operation the electrolysis may take place in the melt between the cathode arc and the molten pool of the component which is deposited in the cathode area.

Alternatively, both the cathode and the anode electrodes may be spaced from the melt and the said current path may include arcs struck from both the anode and the cathode to the melt. In such a case the initial heating of the melt can conveniently be carried out by striking an arc directly from the anode to the cathode.

The invention may be applied to the recovery of volatile inorganic oxides or other compounds of, for example, tin (cassiterite), molybdenum (roasted molybdenite $MoS_2$ and $FeMoO_4$), tungsten (wolframite and scheelite $CaWO_4$), lead, and vanadium (from slags) and other valuable elements associated with these in nature. Molybdenum also occurs in certain complex ores such as those containing complex oxides of molybdenum and iron, and can be fumed off as molybdenum trioxide in a similar manner to that of the vanadium. An analogous system is provided by the lead silicate system.

The use of an arc electrode in the electrolysis process has two particular advantages. Firstly, the previously known dipped carbon electrode method tends to produce contamination of the melt due to reaction between the melt and the carbon electrode in contact therewith. Secondly, a dipped electrode often becomes badly polarised, whereas an arc is free to wander over the surface of the melt, and, by causing considerable turbulence, reduces the effects of polarisation. These two advantages reduce the overall polarisation defects, and this is essential to economic electrolytic processing of many metals, especially tin. Reduction of polarisation is particularly important in melts high in iron oxide in which the current efficiency tends to be otherwise too low in a bath of reasonable depth and composition, owing to semi-conduction and parasitic reactions. The current passing between the anode and the cathode may be direct current produced by a unidirectional potential applied to the electrodes, or the arrangement may be similar to that of an arc furnace where an alternating potential is applied to the electrode, but a direct current component is passed through the melt by virtue of rectification of the applied alternating current by the action of the melt itself.

It is unusual for ores to be amenable to electrolysis without modification of their composition to provide fluidity and ionic electrical conductivity in the molten state. For example, tin oxides require the addition of, for example, lime in sufficient amount to combine with the silica and alumina present and preferably also calcium fluoride. Stirring of the melt may in some cases be desirable during electrolysis. Agitation of the melt may alternatively be achieved by gaseous means, including oxygen gas evolved at the anode, or by electrocapillary agitation of a molten cathode.

Figures 2A, 2B:
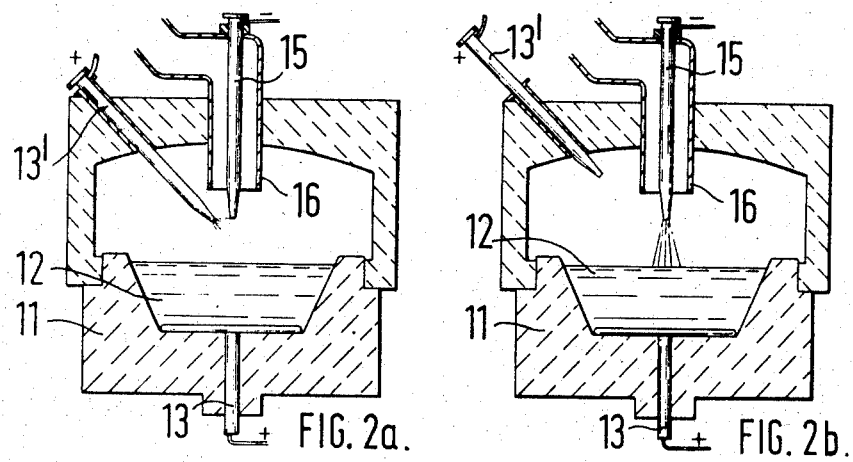
Figure 3:
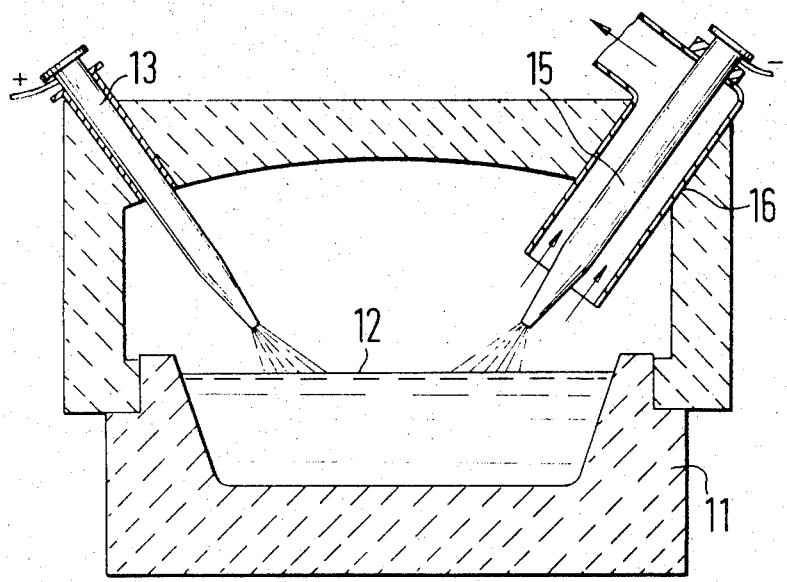

The invention will now be described by way of example with reference to the accompanying drawings, in which:

FIG. 1 shows apparatus, embodying the invention, for separating a metal from a fused ore by electrolysing the ore and drawing off the metal as a vapour or as a volatile oxide of the metal, FIGS. 2(a) and 2(b) show the apparatus of FIG. 1 modified to include a subsidiary anode to effect initial heating of the melt, FIG. 3 shows a further modification of the apparatus of FIG. 1, in which both the anode and cathode are spaced from the melt.

Referring to FIG. 1 a bath 11 is adapted to contain a charge of fused ore 12 in the form of a melt, and is arranged with an anode 13 positioned in the base of the bath.

The atmosphere above the melt 12 is enclosed by a hood 14 through which projects a cathode electrode 15 which is supported above and spaced apart from the surface of the melt 12. Surrounding the cathode 15 is a shroud 16 connected to a fume collector enabling vapour to be drawn off from the atmosphere surrounding the end of the cathode 15.

In operation the fused ore 12 is first heated to produce a melt, the heating being carried out by external heating means or by use of an arc struck in a manner which will be described with reference to FIGS. 2 and 3. In steady state operating conditions an arc is struck between the cathode 15 and the melt 12, the current path being completed through the anode 13. The passage of current through the melt produces electrolysis with the cathode arc acting as the cathode in the electrolytic process.

The melt 12 contains a metal to be removed which is either volatile or has a volatile compound, such as a volatile oxide. During operation, the molten slag or ore from which the desired metal is to be extracted is electrolysed between the anode and the cathode arc in such a manner that ions containing the desired metal are discharged at the arc cathode and vapourised off as a volatile oxide or metal. This fume is then drawn off via the electrode shroud 16, or alternatively through a hole at some other point in the enclosure 14. The fume is then collected and if necessary further processed to yield the metal.

As has been mentioned, if a bottom electrode such as the anode 13 is used, an initial heating process must take place in which the ore or slag, plus any necessary fluxes, are first fused. One way of accomplishing this is shown in FIGS. 2(a) and 2(b) where a subsidiary anode 13' is provided, and can be put in a first position shown in FIG. 2(a) closely adjacent the tip of the cathode electrode 15. The initial heating is then accomplished by means of an arc struck between the subsidiary electrode 13' and the cathode 15 above the surface of the slag or ore 12. When the charge is molten, the subsidiary electrode 13' is withdrawn to the position shown in FIG. 2(b), and thereafter the heat from the electrolysing arc is sufficient to keep the charge molten.

FIG. 3 shows a modification of the apparatus of FIG. 1, in which the anode 13 is not in the form of a bottom electrode, but is positioned above the surface of the melt 12 and spaced apart therefrom, in the same manner as the cathode 15. The current path in the steady state condition is then between the cathode and the melt by way of a cathode arc and between the anode and the melt by way of an anode arc. This system does away with the need to have an extra electrode to fuse the charge as shown in FIGS. 2(a) and 2(b), as the initial heating can be carried out by a direct arc between the anode and the cathode electrodes. However the system including a bottom electrode has advantages stemming from the gas evolution at the bottom of the bath.

Small scale experiments carried out in apparatus essentially as described in FIG. 1, but using a molten tin bottom electrode have given the following results in the recovery of tin from a typical Cornwall tin ore.

Analysis of concentrates used:    Weight percent
$SiO_2$ _____ 29.90
$Al_2O_3$ _____ 19.35
$TiO_2$ _____ 0.51
Sn _____ 26.15
Fe _____ 5.28
As _____ 0.13
P _____ 0.12
B _____ (¹)
All others less than 0.1% each.

¹ Present but not determined.

The concentrate was mixed with finely ground chalk and spar ($CaF_2$) to give a pre-fusion composition:

Percent
Concentrates _____ 62.7
Chalk _____ 32.6
$CaF_2$ _____ 4.7

This was pre-fused, cast into the cell and electrolysed between a molten tin bottom electrode and an upper electrode. The volatile tin bearing material was collected in fractions in a number of thimbles and the weights recovered are given below:

FUME WEIGHTS (A) Arc cathode—Thimble numbers indicate position in a particular run

| | Faradays passed in 10 mins. | Moles $SnO_2$ |
|---|---|---|
| Run 1: | | |
| 1 | 0.0475 | 0.019 |
| 2 | 0.0892 | 0.025 |
| 3 | 0.0160 | 0.006 |
| Run 2: | | |
| 1 | 0.0805 | 0.027 |
| 2 | 0.0134 | 0.006 |
| 3 | 0.0421 | 0.007 |
| Run 3: | | |
| 1 | 0.0964 | 0.050 |
| 2 | 0.0174 | 0.015 |
| 3 | 0.1076 | 0.034 |
| 4 | 0.0160 | 0.008 |
| Run 4: | | |
| 1 | 0.0701 | 0.040 |
| 2 | 0.0980 | 0.065 |
| 3 | 0.1087 | 0.029 |

(B) Arc anode

| | Faradays passed in 10 mins. | Moles $SnO_2$ |
|---|---|---|
| 1 | 0.0078 | 0.011 |
| 2 | 0.0473 | 0.027 |
| 3 | 0.0235 | 0.015 |
| 4 | 0.0313 | 0.020 |
| 1 | 0.0227 | 0.012 |
| 2 | 0.0152 | 0.007 |
| 3 | 0.0167 | 0.010 |
| 1 | 0.0330 | 0.022 |
| 2 | 0.0369 | 0.016 |
| 3 | 0.0434 | 0.019 |
| 4 | 0.0233 | 0.011 |

Calculations show that the volatile material is fumed off by electrolysis and not by simple thermal emission.

As hereinbefore described, the melt may be electrolysed by the application of an alternating potential to an electrode. Moreover, both oxycations and oxyanions may be discharged at the same electrode if certain melts containing species which dissociate into oxyanions and oxycations are electrolysed by application of an alternating potential to the electrode.

We claim:
1. A method of separating a metal or oxide thereof selected from the group consisting of tin, lead, molybdenum, vanadium and tungsten from a melt containing said oxide or a component convertible to said metal or oxide, which comprises electrolysing the melt by passing a current therethrough along a path which includes an arc struck between a cathodic electrode and the melt to produce a vapour containing the metal or oxide, and drawing off the metal or oxide given off from the melt during electrolysis, the composition of the melt being such that a major part of the separated metal or oxide is produced as a result of electrolysis of said melt at said arc.

2. A method according to claim 1, in which arcs are struck from both anode and cathode.

3. A method according to claim 1, in which the heat of the arc is utilised to maintain the molten condition of the melt.

4. A method according to claim 1, in which the melt is derived from a slag.

5. A method according to claim 1, in which the melt is derived from an ore.

6. A method according to claim 1, in which the metal is tin.

7. A method according to claim 1, in which the metal is molybdenum, tungsten, lead or vanadium.

8. A method according to claim 1 in which the fluidity and the electrical conductivity of the melt are improved by the addition of a component which reacts with silica and/or alumina present to produce a silicate and/or aluminate.

9. A method according to claim 8, in which lime and/or calcium fluoride are added to the melt.

10. A method according to claim 1, in which stirring of the melt is achieved by gaseous means.

11. A method according to claim 10, in which stirring is achieved by means of oxygen evolved at the anode.

References Cited

UNITED STATES PATENTS

| | | | |
|---|---|---|---|
| 1,620,880 | 3/1927 | Filmer | 23—140 |
| 2,862,792 | 12/1958 | Rehm | 23—140 X |
| 3,304,169 | 2/1967 | Death et al. | 204—164 X |
| 3,586,613 | 6/1971 | Stewart | 204—164 X |
| 813,786 | 2/1906 | Fink-Huguenot | 23—140 |

OTHER REFERENCES

Metallurgical Dictionary by Henderson, et al., p. 332, pub. Reinhold Publishing Corp., New York, 1953.

FREDERICK C. EDMUNDSON, Primary Examiner

U.S. Cl. X.R.

423—53, 62, 96, 97